United States Patent

Oulton

[15] 3,637,365
[45] Jan. 25, 1972

[54] PREHEATING GLASS BATCH MATERIAL BY MELTING THE BATCH CORE AREA

[72] Inventor: Richard John Oulton, Maghull, England
[73] Assignee: Pilkington Brothers Limited, Liverpool, England
[22] Filed: Dec. 12, 1968
[21] Appl. No.: 783,356

[30] Foreign Application Priority Data

Dec. 19, 1967 Great Britain.....................57,500/67

[52] U.S. Cl..............................................65/134, 65/335
[51] Int. Cl. .......................................................C03b 3/00
[58] Field of Search....................65/134, 135, 136, 335, 346, 65/347; 13/6

[56] References Cited

UNITED STATES PATENTS

2,711,435  6/1955  Humphrey................................13/6 X
3,201,219  8/1965  Frazier et al........................65/335 X

Primary Examiner—S. Leon Bashore
Assistant Examiner—Saul R. Friedman
Attorney—Morrison, Kennedy & Campbell

[57] ABSTRACT

Glassmaking batch material is heated to form a coherent body by heating the material progressively from a central core area, utilizing the heat insulation characteristics of the surrounding batch material to ensure the progressive melting of the batch material from the inside. Heating is preferably effected by electrodes located in a compatible molten glass core filling. A continuous process is described in which the batch material is advanced along a conveyor during treatment before passing into a glass furnace tank.

23 Claims, 14 Drawing Figures

Inventor
Richard John Oulton
By
Morrison, Kennedy & Campbell
Attorneys

PREHEATING GLASS BATCH MATERIAL BY MELTING THE BATCH CORE AREA

BACKGROUND OF THE INVENTION

This invention relates to methods of heating glassmaking batch material and to apparatus therefor.

In the art of melting a glassmaking batch material in a tank furnace, the batch is customarily fed onto the molten glass in a tank at the cold end thereof so as to form a blanket of the material on the molten glass. The blanket is heated by products of combustion injected into the headspace of the tank furnace across the blanket, alternately from one side and then from the other of the tank at the usual regular intervals.

As the blanket moves along the tank towards the hot end, the undersurface of the blanket is heated by the molten glass and the upper surface is heated by the products of combustion projected across the tank. The products of combustion which heat the upper surface of the blanket are at a much higher temperature than that of the molten glass beneath the blanket, and it is not until the blanket is sufficiently thin that the ancillary heat of the molten glass produces a uniform concomitant heat treatment on both surfaces of the layer constituted by the thinned blanket and it is not until the batch material is in this thin layer form that uniform heating occurs.

A main object of the present invention is to achieve an economic method of continually and uniformly heat treating glass batch forming material, and a further main object is to attain uniform heating of the batch material to the stage of converting the batch material into a molten state.

SUMMARY

In heating glass forming batch material according to the present invention a novel principle of operation is involved in which the heat source for heat treating a batch material is enveloped by a surrounding body of the batch material so that the surrounding body of glass forming batch material is utilized as a heat insulation about the heat source to ensure that all the emitted heat is efficiently employed in effecting the desired uniform heat treatment of the surrounding batch material.

From another aspect the underlying principle may be visualized as one in which the required heat source is created in a core area of a body of the glass making batch material to be treated.

Accordingly, a method of heating glassmaking batch material according to the invention is characterized by forming a coherent body of the batch material and effecting the desired heat treatment by creating a heat source in a core area of the coherent body while retaining the heat insulating characteristics of the surrounding batch material to ensure optimum use of heat developed in the core area to melt the surrounding batch material progressively.

Accordingly at all times the surrounding batch material functions to inhibit heat losses from the core area.

In accordance with the invention a coherent body of granular batch material may be formed into desired shape on a support or by filling the batch material into a suitable shaped container. The granular material utilized in either circumstance may be batch material which has been given a sufficient quantity of moisture (up to 10 percent content) to engender cohesion throughout the body during the heating operation.

A heating process carried out in accordance with the present invention may consist of a process of preheating batch material as a step precedent to feeding the batch material to a tank furnace, thus the heat treatment may extend to melting the lower melting point components of the batch material so as to form a matrix about the components of the higher melting point, or the components of the batch may be arranged in layer form, the layers being graduated according to the melting points of the components in each layer, e.g., as hereinafter more particularly described.

However, an especial heating process according to the invention may be a heat treatment which results in at least the major volume of the coherent body being converted into a molten body of glass compatible with a molten glass held in a glass melting tank to replenish the tank as fined molten glass is withdrawn therefrom.

Accordingly the heat source employed in a method of operation according to the invention may be provided by creating in the core area a heat source consisting of molten glass and automatically increasing the volume of molten glass by the addition of freshly melted batch to the heat source as the internal batch surface defining the core area retreats and the volume of the core area increases.

Having created a heat source of molten glass in the core area, continuous heating may be achieved in accordance with the invention by utilizing the conductivity of the molten glass to engender sufficient heat to progressively melt the retreating batch face. This method of converting the batch material into molten form ensures a continuous agitation of the molten glass engendered by convection currents and by the agitation a homogeneous glass is maintained in the heat source.

In operation, the heat source in the core area immediately operates on the adjacent surface of the surrounding body of glassmaking batch material and the original volume of molten glass will be increased by the continual flow of molten glass derived from heat conducted from the heat source to the innermost surface of the surrounding batch material, in other words the thickness of the surrounding batch material measured radially from the core area will correspondingly increase as heating continues and the inner face immediately surrounding the core area is continually being melted and renewed, and in consequence the inner face of the surrounding material is continually retreating from the heat source occupying the core area.

The coherent body of batch material may be encased in a retaining wall to maintain sufficient structural strength in the body when the internal batch surface defined in the core area has retreated to outer regions of the coherent body.

Alternatively, the retaining wall may be formed by fritting the outer region of the formed coherent body.

The retaining wall may be formed of wood, in which case the heating process would be stopped when the lining of the surrounding body of batch material has obtained a thinness such that heat is transmitted through the wall at a rate to burn the containing wall. When significant amounts of heat reach the retaining wall of wood the heating operation is arrested, so that the accumulations of molten glass in the fringe core area may be discharged, and the wooden wall, lined with hot batch material, recharged for a further heating operation.

The present invention accordingly provides economically efficient means, i.e., from the point of view of use of heat emitted from the heat source, of producing relatively small quantities of different types of glasses, varying in color hues, or varying in characteristics, such as of refraction, or of coefficient of expansion or contraction.

Alternatively, when the molten glass produced is to constitute a means of supply of molten glass to a glass melting tank (or a pot), e.g., in regard to a melting tank, in a volume in compensation for the volume of fined molten glass withdrawn from the tank, the retaining wall is formed of a glass compatible with the molten glass formed from the batch material and then if the heat transmission to the wall is such that the wall collapses, the softened wall and lining of unmelted batch material may be discharged with the molten glass into the melting tank.

Instead of surrounding the heat source with a conventional homogeneous batch material the heat source may be surrounded by a coherent body of batch material in layer form, constituted in such a way that the layer contiguous to and surrounding the core area comprises one or more of the batch components having the highest melting point, the succeeding surrounding layers comprising components of progressively lower melting points.

Where the heat source in the core area is constituted by molten glass, the heat source may be formed by charging into the core area compatible cullet and the cullet melted to expedite the creation of a heat source of an electrically conducting body of molten glass in the core area.

To this end there may be provided in the core area constructed according to the invention a coiled compatible glass in proximity to the innermost batch surface defining the pristine core area with which glass is operatively associated an electrical conductor to expedite the creation of an electrically conductive heat source of molten glass in the core area of the coherent body of batch material. Preferably, and particularly where the batch material comprises a water content for the purpose of engendering cohesion throughout the body during the heating operation there may be formed above the heat source a concentric tubular gas vent constituted by a track of loosely packed batch material extending from the central part of the pristine core area to the surface of the coherent body at the level of the top of the retaining wall, whether the wall be wood or of glass.

By locating the higher melting point components of a glassmaking batch material about the core area higher starting temperatures may be utilized hence a correspondingly high energy input is possible in starting up, at which time the maximum heat insulating from the batch material is available.

From the foregoing it will be appreciated that the present invention comprehends the construction of a portable coherent body of glassmaking batch material having a vacant core area constituted by a central socket of small volume as compared with the volume of the coherent body, said socket being adapted for the reception of a heat source for continually transmitting heat to the coherent body whether the heat source is initially a molten body or is converted into a molten state during the initial phases of a heating operation.

The present invention further comprises a method of feeding glassmaking batch material to a glass melting tank furnace characterized by locating in the doghouse of the furnace in coaxial alignment with a set of burners mounted in ports in opposed walls of the doghouse a tubular body of coherent batch material, so that a flame at batch melting temperature is alternately projected into the bore of the tubular body of the batch from each end thereof and simultaneously fritting the outer surface of the tubular body by utilizing the ambient heat in the doghouse during the progress of melting the batch in the core area continually defined by the progressive retreating inner surface of the batch as melting takes place and then rolling the heat treated batch into the molten glass in the furnace tank.

The invention also comprises a method of feeding glassmaking batch material to a glass melting tank furnace characterized by making (e.g., by extrusion or pressing) a rollable hollow body of the batch, applying sufficient heat to the batch through the bore of the hollow body to progressively melt the material defining the bore maintaining the internal heat treatment so long as the wall thickness of the body is sufficient to ensure rollability, advancing the internally melted body into the feeding end of the tank and allowing it to dwell in the feeding end thereby subjecting the external surface of the hollow body to the heating effect of the furnace gases and thereafter rolling the heated batch into the molten glass in the tank.

Further the present invention comprises a modified method of heating glassmaking batch material which method is characterized in that the heat source in the core area of the batch material is formed by spreading a thick layer of coherent batch material on a deformable support channelling the layer and pouring molten glass into the central area of the channel, covering the molten glass with a thick layer of the batch material, projecting aligned electrodes in spaced relation into the molten glass and energizing the electrodes.

The present invention also comprises apparatus devised for heating or melting batch material according to the method of operation in accordance with the present invention said apparatus being particularly described and defined in the accompanying apparatus claims.

BRIEF DESCRIPTION OF THE DRAWINGS

FIGS. 11 and 12 illustrate an alternative method of melting wherein the batch material is of tubular form and heating is effected by projecting hot gases into each end of the bore alternately and allowing discharge at the other end.

DESCRIPTION OF THE PREFERRED EMBODIMENTS

Figure 1:
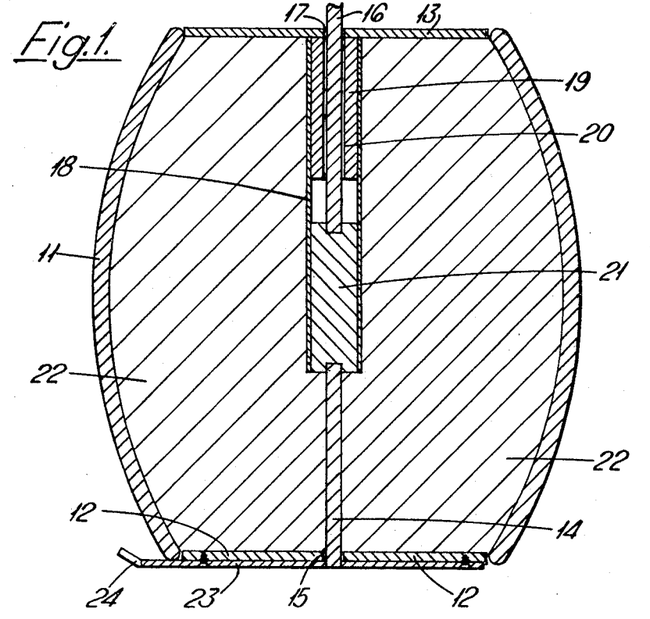
FIG. 1 is a vertical sectional elevation of one form of electrical heating apparatus taken on the line I—I of FIG. 2.
Figure 2:
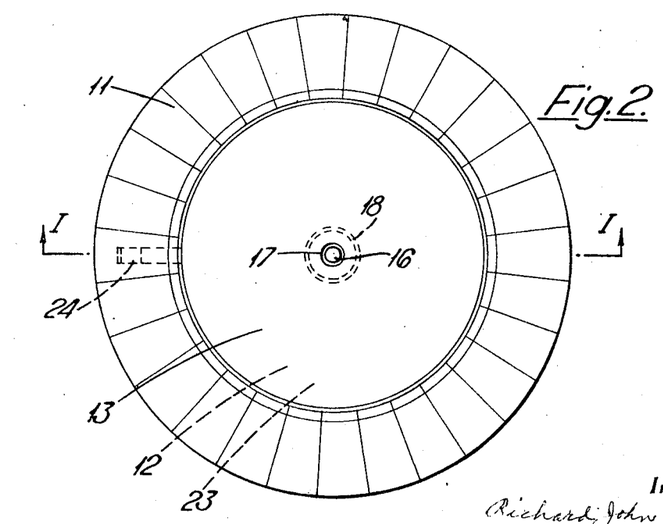
FIG. 2 is a plan of the apparatus shown in FIG. 1.

In the apparatus illustrated in FIGS. 1 and 2 a containing wall constituted by wooden barrel 11 has a bottom 12 and top 13. An electrode 14 passes through an opening 15 in bottom 12 and an electrode 16 passes through an opening 17 in top 13, the electrodes 14 and 16 extending axially of the barrel and terminating short of the midlength thereof so that the inner ends of these coaxial electrodes 14 and 16 are in spaced relation.

A glass tube 18 formed of glass compatible with the melted constituents of the batch material in the barrel extends from the top 13 axially downwards past the midlength of the barrel to terminate below the upper end of the electrode 14 and a filling 19 of loose batch material fills the upper regions of tube 18 in the nature of a porous plug therein and has an axial bore 20 to allow passage of electrode 16 therethrough.

A volume of molten glass 21 is poured into the lower regions of tube 18 to surround the upper end of electrode 14 and the upper level of the molten glass 21 lies above the level of the lower end of electrode 16. Thus, the inner ends of both the electrodes 14 and 16 are surrounded by the molten glass 21 and the molten glass 21 thereby constitutes part of a conductive path for an electric heating current passing between the electrodes 14 and 16. The whole of the barrel 11, externally of tube 18, is filled with batch 22 so that electrode 14 and tube 18 are enveloped by the batch 22 to be treated.

To erect the heating assembly, electrode 14 is passed through the opening 15 in bottom 12 and secured in the barrel in position by an external insulated conducting plate 23 which has an electrical connector, as indicated at 24, for connection to a suitable electrical mains. The barrel is then partially filled with batch material 22 to a level just below the upper end of electrode 14, the tube 18 is positioned in the barrel with the exposed inner end of electrode 14 located coaxially within the lower end of tube 18 and the filling of the barrel with batch 22 is completed. A molten glass 21 is then poured into the glass tube 18, a batch filling 19 is located into the tube 18, the top 13 is positioned to close the upper opening end of barrel 11 and electrode 16 is passed through the opening 17 in lid 13 and through a bore 20 formed in the porous filling 19 until the inner end of electrode 16 contacts and is immersed in the molten glass 21. It will be observed that the diameter of each electrode is, in the embodiment shown, considerably less than the diameter of the body of molten glass 21 within the tube 18, the purpose of which is to maintain thermal agitation as hereinafter fully explained.

The porous filling 19 in the upper part of the tube 18 is a filling of loose batch material which filling provides in its interstices tortuous passages for the escape of gases generated during the chemical reactions which take place during the melting of the batch material as well known in the art and of water vapor derived from the water content of the batch material within the container wall.

By separating the gases of reaction from the molten glass before the molten glass is introduced into a glass melting tank of normal form the amount of gases released in the tank are significantly reduced and the normal experience of dilution of the tank atmosphere correspondingly restricted. Further, the molten glass fed to the tank has a temperature exceeding the melting temperature of the glass, and apart from achieving maximum extraction of the reaction gases, a greater heat contribution to the molten glass in the tank occurs. Since the molten glass produced according to the invention has already released a proportion of the gases in solution a further reduction in the volume of the gases to be released during the travel of the glass through the tank is experienced.

It will be seen from the above arrangement that the core of molten glass 21 constitutes a heat source which can only lose heat through the walls of tube 18 to the enveloping batch 22. The lower regions of tube 18 are soon melted by the molten glass 21 and become absorbed into the ambient molten body of glass 21 so that at this stage the heat source constituted by the molten glass 21, is intimately surrounded by batch 22, the core of molten glass 21 therefore can only lose heat to the surrounding batch 22 and the only heat loss from the system in the initial stages will be heat conducted along electrodes 14 and 16 so that a very high heat transfer efficiency to the batch is obtained.

The surrounding batch 22 will have a temperature at about the temperature of the contiguous molten glass 21, but, because the batch 22 is a good heat insulating material, a severe temperature gradient will be established through the batch 22 immediately adjacent the core of molten glass 21 and the outer regions of the batch 22 effectively insulate the timber parts of the barrel 11 from the heat source 21 so that the barrel 11 will not be subjected to detrimental heating until the major part of the batch 22 is at a temperature above 800° C.

The heat source 21 is maintained at the desired temperature, i.e., above 1,000° C., by passing an electric heating current between electrodes 14 and 16. This causes that part of the molten glass 21 lying directly between electrodes 14 and 16 to be heated to a temperature above the average temperature of the body of molten glass 21, thereby creating a column of high temperature glass within the body of glass 21. As hot "thin" glass will always rise through a body of molten glass at lower temperature, thermal currents will be established in the body of molten glass 21 and said molten glass 21 will be in a constant stage of agitation.

This thermally induced agitation causes a mixing of the molten glass 21 and as the batch adjacent the molten glass 21 melts it is stirred into the body of molten glass 21 and forms an integral part thereof.

It will be appreciated that although a thermal agitation within the glass 21 will be established, the outer surface of the glass body 21 will be continuously losing heat to the surrounding batch 22 so that there will be little movement at the outer surface of the glass body 21 and very little scraping of the batch will be experienced. This means in effect that batch 22 will only be absorbed into the glass body 21 when the ambient batch has attained a temperature above the "flow" temperature of the glass 21. If the batch 22 has been uniformly mixed it will, at the flow temperature of the molten glass 21, have been substantially converted into glass form and, therefore, the presence of unmelted particles in the molten glass 21 will be very limited, and any such particles will be moved about within the glass 21 by the thermal agitation thereof, so that, the dissolving or absorption of particles will be accelerated in the hot glass flow. In use the filling 19 functions as a vent for gases in the heating zone—which gases heat the filling as they are released from the heating zone.

The batch 22 may be compacted granular material and the batch material may contain a modicum of moisture to assist in maintaining a coherent mass within the barrel 11.

Figures 3, 4, 5:
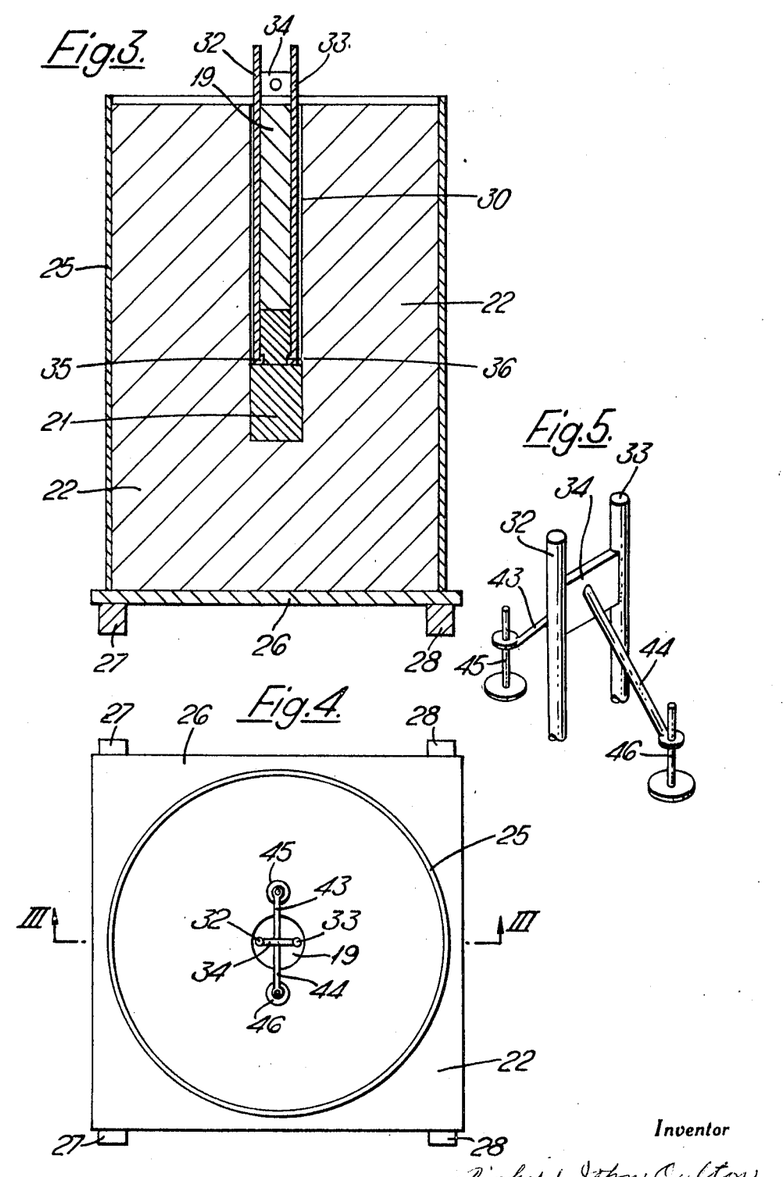
FIG. 3 is a vertical sectional elevation of a modified form of electrical heating apparatus taken on the line III—III of FIG. 4.
FIG. 4 is a plan of the apparatus shown in FIG. 3.
FIG. 5 is a pictorial view of the electrode support included in the apparatus shown in FIGS. 3 and 4.

FIGS. 3 to 5 show an alternative heating assembly wherein the containing wall is a glass cylinder 25, open at both ends, vertically disposed on a floor constituted by a glass plate 26 supported on horizontal bars 27 and 28 by which the assembly can be conveyed from place to place. Batch 22 is charged into the glass cylinder containing wall 25 and is compacted to leave a cylindrical bore 30, which bore extends axially downwardly past the midlength of wall 25, as indicated in FIG. 3. A quantity of molten glass 21 is introduced into the axial bore 30 so as to fill the lower regions thereof and parallel electrodes 32 and 33, held in spaced relationship by an insulating crossmember 34, see FIG. 5, are lowered down the bore 30 until the inwardly turned feet 35 and 36 of electrode 32 and 33 respectively are totally immersed in the molten glass 21.

The axial bore 30 is then filled with loose batch 19 so that the heat source, constituted by the molten glass 21, is wholly enclosed by batch while gases created during the conversion of batch to glass can escape upwardly by passing through the loose batch 19 within the axial bore 30. Said gases, in passing through the loose batch 19, are thus forced to impart heat to the loose batch 19 so that in the initial heating stages almost the only heat lost from the assembly is by conduction through the electrodes 32 and 33 to atmosphere.

With this arrangement an electrical heating current applied through electrodes 32 and 33 is caused to flow through the molten glass 21 lying between the juxtaposed lower ends 35 and 36 of electrodes 32 and 33 respectively and the heat generated in the molten glass 21 is transmitted by conduction and by convection, due to the thermal convection currents induced in the molten glass by the heating current and agitating the molten glass, so that the average temperature of the molten glass 21 is maintained at the desired level.

Because of the heat insulating properties of the batch materials 19, 22 a severe temperature gradient will be established through the batch material immediately adjacent the molten glass 21 so that in the initial part of the heating process very little heat will be transmitted to the container walls constituted by the glass cylindrical wall 25 and glass plate 26. As the batch 19, 22 adjacent the molten glass 21 is melted and absorbed into the core 21 of molten glass constituting the heat source, the amount of batch insulating the molten glass 21 from the container parts 25, 26 is reduced and eventually heat will be transmitted to these glass parts.

At this stage, the electrodes 32 and 33 can be removed and the entire assembly i.e., the molten glass 21, unmelted batch 22 and the glass wall and bottom parts of the container can all be introduced into the melt end of a glass melting tank or into a melting unit. Alternatively, only the molten glass and unmelted batch may be introduced into the tank or melting unit so that glass cylinder 25 and plate 26 can be recharged and used over again.

During the heating cycle it may be desirable for the path of the electric heating current to be moved within the arrangement and the unitary arrangement shown in FIG. 5 constitutes means readily affording such displacement.

The insulating connecting plate 34 supporting electrodes 32 and 33 has two arms 43 and 44, see FIG. 5, extending therefrom and the arms 43 and 44 have extendable feet 45 and 45 respectively which feet rest on the upper surface of the batch in the container wall 25. Thus the vertical location of the electrical heating path can be varied by adjusting the feet 45 and 46 relative to arms 43 and 44 respectively.

Although the foregoing examples show the use of only one electrical path through the molten glass it will be appreciated that more electrodes can be installed either during the initial part of the heating cycle or at a later stage in the heating cycle and thus the actual electrical heat energy imparted to the assembly can be increased or reduced as required, or if as already explained it is desired to change the path of the electrical current, then the electrical arrangement shown in FIG. 5 can be readily used and adjusted.

In the two described embodiments of the invention the total heat required to melt the batch is imparted with very high efficiency and, dependent upon the size of the container and the volume of batch, more than 50 percent of the total heat required for melting can be directly transferred to the batch surrounding the heat source during the heating process.

As long as the exterior of the container is not losing much heat, the thermal efficiency is very high, and therefore additional heat can be imparted to the batch with the same high rate heat transfer efficiency.

Thus, with the assembly shown in FIGS. 3 to 5 a high heat transfer efficiency is obtained up to the stage at which the glass cylindrical wall 25 and/or plate 26 begins to release heat to its surroundings. By introducing the assembly into thermal surroundings which will reduce or eliminate the heat loss from the container then the heat input to the batch can be increased without loss in efficiency.

Figure 6:
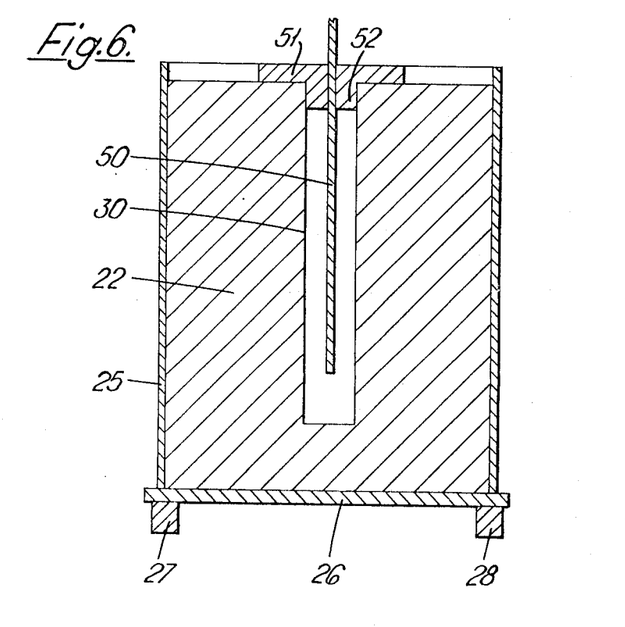
FIG. 6 shows in vertical sectional elevation a further modified form of heating apparatus according to the invention.

FIG. 6 shows a further embodiment of the invention and wherein a coherent body of batch 22 has a central axial bore 30 extending downwardly below the midlength of the body 22. A radiant heating element 50, supported by a removable batch cap 51 having a boss 52 closing the upper end of bore 30, imparts radiant heat to the surrounding batch 22 to effect a heating, and eventually a conversion to glass of the batch in the region of the batch wall defining the bore 30. It will be appreciated that with this arrangement the converted batch will flow down the bore 30 to collect in the lower regions thereof and, after the heating process has passed a predetermined limit, electrodes for passing electric current through the converted batch can be substituted for or used in addition to the radiant heater 50. Alternatively, radiant heaters of different shape and power rating may be used during the later stages of heating.

The foregoing examples have been limited to the heating of conventional batch mixture. This is not an essential of the present invention and FIG. 7 shows one example wherein glass can be made with the constituents initially in separated form, so that selected constituents can be arranged to lie in concentrated layer form in specific locations of the body.

Figure 7:
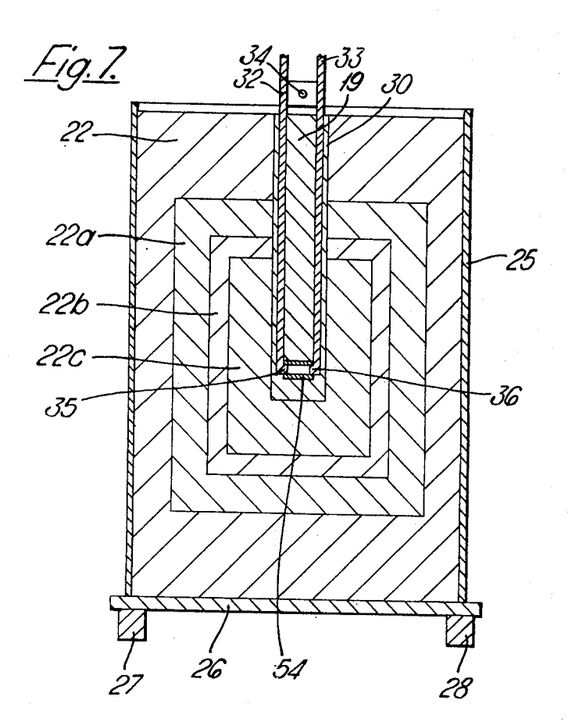
FIG. 7 is a vertical sectional elevation of another form of electrical heating apparatus in which the batch material is assembled for heating in concentric layer form.

In the embodiment illustrated in FIG. 7 a container, comprising a cylindrical glass wall 25 with a glass bottom plate 26 is lined with batch 22 and filled with selected layers of glass making constituents 22a, 22b and 22c which surround the lower regions of an axial bore 30 extending downwardly into the batch, past the midregion thereof. Electrodes 32 and 33, constructed as illustrated in FIGS. 3 to 5 and held in spaced parallel relationship by an insulating plate 34, are passed down into the blind bore and the bore is filled with loose batch 19 to allow for the escape of gases.

In this case, the heating process is initiated from cold by a glass tube 54 (see FIG. 8) which extends between the inwardly turned feet 35, 36 of electrodes 32 and 33 respectively, which tube 54 is coated with electrically conductive material such as a colloidal graphite. When heating current is first passed between the electrodes 32, 33 the current passes through the electrically conductive material on the glass tube 54 until the glass tube 54 is sufficiently heated as to become conductive, after which the tube constitutes the heat source in a core area of the batch for transmitting heat to the surrounding materials. The tube 54 is so arranged that after it melts the molten glass forms a pool which continues to be heated by current passing between the electrodes.

The separated layer arrangement of the glassmaking constituents as shown in FIG. 7 may be carried out for a number of reasons such as to allow the longest heating time for the most difficult constituent, i.e., either the constituent with the highest heat insulating value, or to give a longer heated period for the reaction of two "difficult" constituents. As the heat input increases the thermal convection currents in the molten glass will cause a stirring of the molten glass material which is fluid within the insulating blanket of batch 22 so that a mixing of the constituents can be carried out after heat transmission to the separated constituents. The present invention can accordingly be utilized to arrange the reaction of the constituents in a desired sequence but care must always be taken to ensure that the heat source is maintained electrically conductive as and when desired in the process. As all the layers will be reacted before the batch lining 22 is heated to melting temperature a homogeneous glass mixture can still be obtained from the separated constituents before the container 25, 26 reaches "collapse" temperature.

Figure 8:
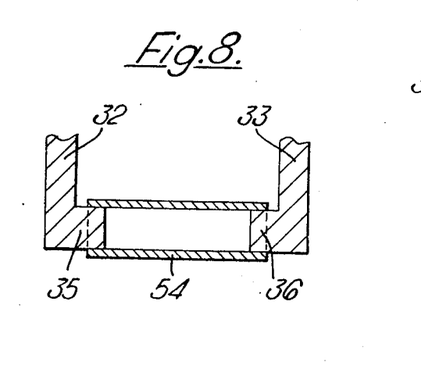
FIG. 8 is a detail view, in sectional elevation, of the apparatus shown in FIG. 7.
Figure 9:
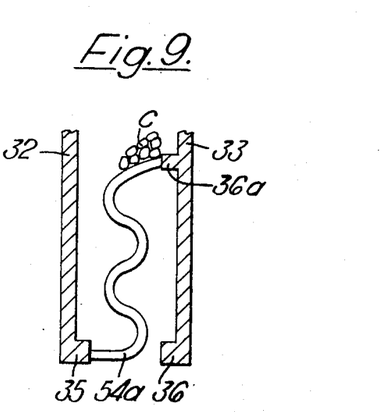
FIG. 9 is also a detail view, similar to FIG. 8, showing a modified electrical heater for starting up the conversion of the batch material into a molten state.

In FIG. 9 there is shown an arrangement giving a longer conducting path than that of FIGS. 7 and 8 and therefore a higher heat input during the initial stages.

As shown in FIG. 9, the two electrodes 32, 33 have feet 35, 36 arranged in a manner similar to the electrode feet 35, 36 of FIGS. 3 to 5. In this case, however, electrode 33 has a lug 36a and this lug is connected to the foot 35 by a spiral glass rod 54a having an electrically conductive coating. This spiral rod 54a, when supplied with electric current by the electrodes 32, 33 heats a much larger volume than that heated by the tube 54. A volume of cullet c may be placed at the upper end of the spiral rod 54a, to assist the formation of a volume of molten glass in the initial stages of heating. When the rod 54a is melted current flows between the feet of the electrodes 32, 33 as in the FIG. 3 arrangement.

It will now be appreciated that the present invention comprehends heating glassmaking batch materials in either conventionally mixed batch or batch in layer form as herein described by allowing heat to be transmitted to the batch from a central internal heat source so that the batch is utilized to insulate the heat source and the high insulating characteristics of the materials are used to assist the heating process rather than resist said process as is experienced with most of the previously known heating methods.

The proposed heating process can be instigated from a hot start i.e., by introducing a molten body of glass into the glassmaking materials forming the batch, or from a cold start by introducing a heating element such as tube 54 in FIG. 8 which is conductive at low temperatures, as described with reference to FIG. 7, 8 and 9.

Figure 10:
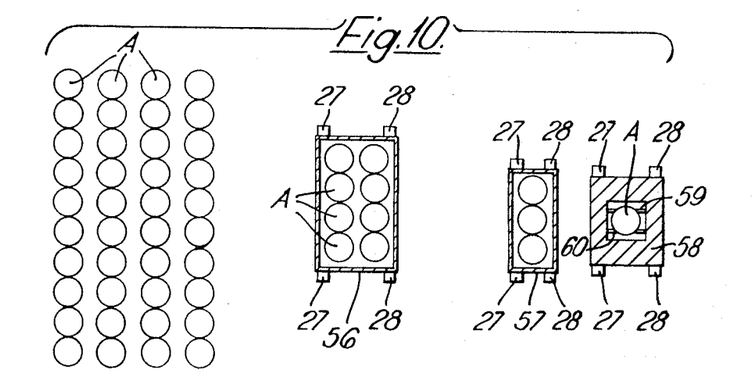
FIG. 10 is a series of plan diagrams showing a layout for stage by stage heating of glassmaking batch material, intended for producing from a group of coherent bodies of the batch material, molten glass for supply to a glass melting tank furnace in compensation for fined glass taken from the tank.

FIG. 10 shows diagrammatically an installation which allows the heat input to the batch to be increased, while retaining the high heat transfer efficiency after the container wall begins to receive heat from the interior of the assembly.

In the illustrated example a chamber 56, in this case of rectangular cross section, has an atmosphere at a temperature in the region of 200° C., and contains eight heating components of the type illustrated either in FIG. 1 and FIG. 2, or in FIGS. 3 to 5, or in FIG. 6 or in FIGS. 7 and 8 or 9, and indicated generally by the reference "A," a second chamber 57 contains three such components and has an atmosphere maintained in the region of 550° C., and a third chamber 58, which is a high temperature chamber, i.e., having an internal temperature above 800° C., is dimensioned to contain only one such component. The chambers 56 and 57 have electrical means for maintaining the supply of energy to electrodes such as electrodes 32 and 33. The floor of the chamber 58 is supported by two bars, 27 and 28, and the chamber 58 is located by the bars directly above the molten glass in the melt end of a continuous glass tank or a melting unit (not shown).

The installation illustrated in FIG. 10 is intended for the supply of raw materials to a glass melting furnace, and each heating component of the assembly in chamber 58 contains sufficient raw materials to supply molten glass in replacement of the quantity of glass drawn off from the working end of the furnace in 1 hour. This means that an appropriate assembly of components must pass per hour through chamber 58 and the components of the heating assembly each comprise floor plate 26 and containing wall 25, the molten glass within the containers and the small amount of unmelted batch remaining in the container 25, 26 must fall from chamber 58 into the molten glass therebeneath within an hour.

The installation shown in FIG. 10 includes 40 heating components in the initial heating stage, said 40 components each having their heating cycle initiated at 1 hour intervals and, because at this stage the containers 2 are not receiving heat from the contents thereof, said 40 components can be exposed to the atmospheric air.

As the most advanced assembly of the 40 components reaches that stage in the heating cycle where the transfer of heat from the interior heat source becomes evident by an elevation of the temperature at the container wall, such components are moved into chamber 56 where the ambient temperature (200° C.) exceeds that of the containing wall 25 so that loss of heat from the component is inhibited and the internal heating process continues with very high efficiency. Again, as the surface temperature of a component in chamber 56 increases above the chamber temperature the component is moved out of the chamber 56 into chamber 57 which has a higher ambient temperature (550° C.) so that heat losses from the component are arrested and the very high heat transfer efficiency of the internal heating arrangement is maintained.

Each component has such dimensions and such an arrangement of heat source that up to this stage the floor plate 26 is the coldest part of the component so that movement of the components, by forklift trucks or roller conveyors, is readily effected and, if necessary, cold air draughts can be directed against the underside of the floor plate 26 to maintain said plate in a stable condition to support the component over a roller conveyor or other conveying means.

It will be appreciated that as the heating operation progresses and batch is converted into glass and absorbed into the heat source, the volume of the heat source increases and the volume of the batch affording heat insulation to the heat source decreases as the inner surface surrounding the heat source retreats.

The heat insulating walls of batch surrounding the heat source in each component thus diminish in thickness and the transfer of heat to the surrounding casing and floor 26 is effected with increasing rapidity. Thus, while an initial heating period of 40 hours may be necessary before increased surface temperature of the container wall becomes evident it may only take 8 hours for the rate of heat transfer to the surface to increase so that the surface temperature of the container wall reaches 200° C. above the temperature of the atmosphere, and a mere 3 hours before the surface temperature reaches 550° C.

When the surface temperature of a component in chamber 57 exceeds the temperature in chamber 57, i.e., 550° C., the electrodes 32 and 33 are removed from the component and the component is moved into chamber 58 where it is supported on rails 59 and 60. The chamber 58 is open between the rails 59, 60 to the atmosphere over the glass tank and is thereby very hot i.e., 800° C., and each floor plate 26 is also exposed to heat radiation from the glass tank and the atmosphere above.

Further, the component now contains a very large volume of molten glass and only thin walls of batch insulating the molten glass 21 from the enclosing walls 25 and floor plate 26 so that these parts of the component are rapidly heated and in less than 1 hour attain a temperature at which the glass, of which they are composed, is no longer rigid enough to retain its contents so that the component collapses and falls with contents into the molten glass therebelow.

It will be appreciated that throughout the heating cycle the external surfaces of each assembly of components will always be the coldest part thereof so that at the collapse point the contents of each component must be at a temperature above the collapse temperature of the containing wall such as 11 or 25, and the actual heat input required to be supplied to the unmelted batch by the furnace will be only a very small part of the total heat required to raise the component and its contents to melting temperature.

It will be appreciated that the numbers of components in each specific chamber and the number of chambers and the temperatures of the atmosphere in these chambers have been recited only by way of example and the actual heating cycle for each assembly will depend on the volume and shape of the assembly, the volume of molten glass in the heat source 21 initially introduced into the arrangement and the strength and duration of the electric heating current.

During the initial part of the heating process large quantities of heat can be imparted to the glassmaking materials, with negligible heat losses from the system and with very little capital expense on housing the components of the assemblies for heating. Further, by providing chambers to house components having atmospheres heated to only low temperatures relative to the average temperatures through the heating arrangements the heat input to the glassmaking materials can be increased for very little additional capital cost.

The process according to the invention can be continued until practically the whole of the volume of each heated component has been converted to glass and the discharge of the molten glass and heated materials into the next heating stage is effected without introducing undesired matter into the glass.

The delivery of preheated glassmaking materials and molten glass to a tank furnace by the method according to the present invention not only provides a very efficient and cheap method of heating the glassmaking constituents but also reduces the melt area required in the tank so that the output of a given tank size is substantially increased.

It will also be appreciated that the present invention is dependent upon the establishment of a steep temperature gradient between the exterior of a body of glassmaking materials and a heat source within the body. The heat source is preferably maintained at an average temperature above 1,000° C. and the thickness of the materials surrounding the heat source is preferably such as to allow the establishment and maintenance of a very severe temperature gradient in the glassmaking materials immediately adjacent the heat source.

The addition of heating apparatus into the heat source can be prearranged by, for example, symmetrically burying about the core area additional electrodes in the body of glassmaking materials so that the materials in the region of each electrode are sufficiently heated to become electrically conductive, and become ancillary means of heating the core area.

In one method of feeding preheated and/or melted batch material to a glass melting furnace the batch, made in coherent tubular form and internally heated, is rolled along the floor of the doghouse on to molten glass in the tank of the furnace when the heating operation is complete. The body may be internally heated by directing a melting flame into its bore.

In one method of supplying molten batch material to the tank of a glass melting furnace according to this aspect of the present invention, the batch, made in coherent tubular form, is located in the doghouse in coaxial alignment with a set of burners mounted in opposite walls of the doghouse so that a flame at batch melting temperature is alternately projected into the bore of the tubular body of batch from each end thereof and simultaneously the outer surface of the tubular body is subjected to the ambient heat in the doghouse by which the outer surface is fritted and thereby reinforced sufficiently to be rolled along the floor of the doghouse from the burners to the molten glass in the tank, to which tank is fed the heated shell of batch material as well as the molten glass.

In an alternative method of feeding glassmaking batch material to the tank of a glass melting furnace according to the present invention, the batch formed into a rollable coherent tube (e.g., by extrusion or pressing) is deposited on a support outside the doghouse and there is internally heated by a first set of burners.

The heat is preferably derived from either gas or oil burners, which burners project a flame at a batch melting temperature into and coaxially with the bore of the tube to progressively melt, in an outward direction, the interior batch surface which surface continually defines the core area of the tubular batch body during this melting stage.

This heating operation may be the first stage of a heat treatment of the batch according to this aspect of the invention and the second stage is effected in the doghouse where the enlarged bore of the tubular body is made available to the coaxial burners in the doghouse.

In the second stage the heating may continue until the wall thickness of the tubular body of the batch is approaching, but has not achieved, the thickness dimension at which the wall has insufficient strength to maintain its tubular form as it rolls away from the doghouse burners on to the molten glass in the tank.

After the internal batch heating operation has been completed to the desired extent whether or not it has been carried on to the extent of approaching the minimum wall thickness for maintaining the tubular form of the batch, it is pushed by rods or the like passing through the doghouse door to initiate the rolling movement desired to move the batch from the burners to the molten metal.

To facilitate the rolling, the floor of the doghouse may be inclined downwardly from the location at which the tubular batch dwells in register with the burners to the molten glass in the furnace tank and may terminate below the surface of molten glass in the tank. Heaters may be embedded near the forward edge of the floor.

Apparatus in accordance with this aspect of the invention for use in carrying out the heat treatment of glass forming batch material in a glass melting tank furnace is characterized by coaxial burners mounted in opposite ports in the sidewalls of the doghouse at a height above the floor of the doghouse equal to half the diameter of a tubular body of coherent batch material.

Reference has hereinbefore been made to a set of burners, either in the doghouse only or in the doghouse and outside the doghouse, and the reference is meant to include aligned flame projecting means, each within a port, which port acts as an exhaust port for the opposite burner and vice versa when the burners are changed over as occurs with burners in ports formed along the tank wall of the furnace structure by associating the ports and burners with a reverberatory furnace heating system.

Figure 11:
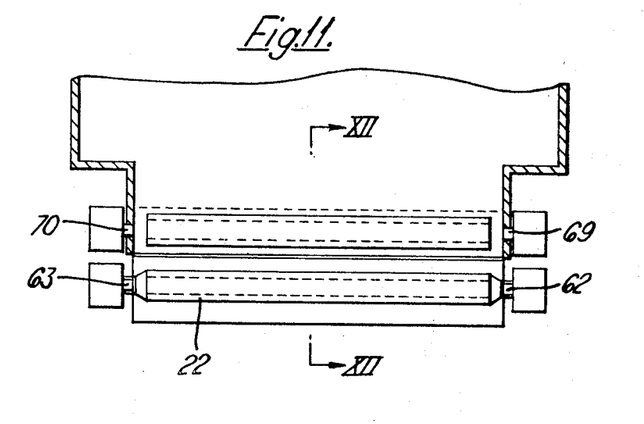
FIG. 11 is a sectional plan view of the doghouse of a glass melting furnace and FIG. 12 is a section on line XII—XII with burners within and outside of the doghouse.
Figure 12:
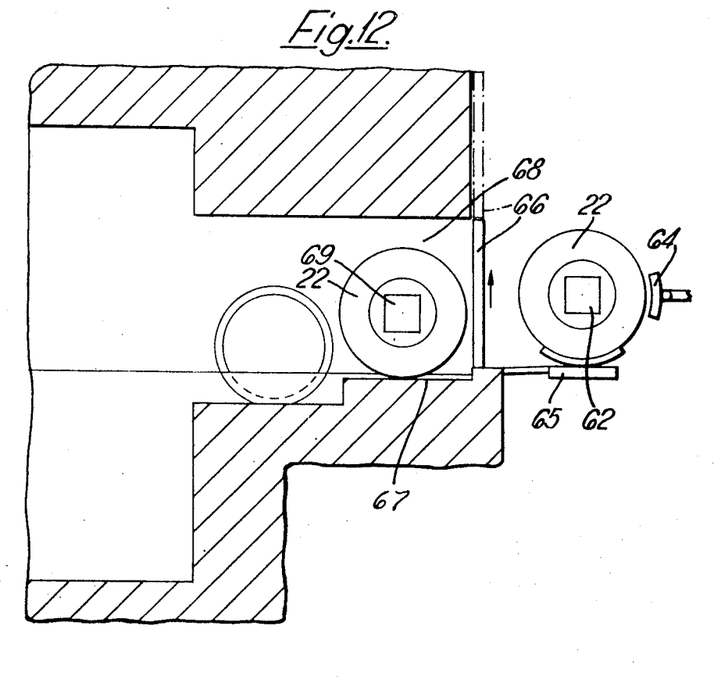

Such a method of feeding glassmaking batch material to a glass melting tank is diagrammatically illustrated in FIGS. 11 and 12 of the accompanying drawings.

In the illustrated arrangement the batch is formed by extrusion into a tube 22. A gas or oil burner flame is directed from a port 62 through the bore of the tube and is exhausted through an exhaust port 63. The tube of batch 22 thereby serves to contain the flame and in consequence the batch 22 is heated from an internal heat source and in the core area of the tube.

The heating arrangement illustrated works on a two stage basis. In the first stage, the burner set 62, 63 heats a tube 22 of coherent batch material outside a glass melting tank and after the heating has progressed to a predetermined stage, the tube of batch 22 is advanced inwardly by a pusher 64 so as to roll it from a supporting conveyor 65 through a doorway normally closed by a door 66 on to the floor 67 of the doghouse 68 of a glass melting furnace to a second heating stage position where the tube 22 is aligned with a second burner and exhaust set 69, 70 for completion of the internal (or core area) heating operation.

During the second heating stage the tube 22 is submitted to the heat in the doghouse 68 which heat is sufficient to frit the external surface and thereby reinforce the batch wall to permit the final rolling of the batch to the tank of molten glass in the furnace when the internal heating is completed.

By converting batch material into a molten state according to the invention a very rapid heat transfer can be carried out by this method and by making the direction of the flame reversible between the ports 62, 63 and ports 69, 70 e.g., by using a reverberatory furnace in association with the said ports approximately uniform melting is obtained and a good heat exchange efficiency between the flame and the internal wall of the tube 22 is achieved.

When the tube 22 has been subjected to the flame between ports 69 and 70 for the desired period the tube 22 is moved along the doghouse floor 67 on to the molten glass in the tank. The batch melting operation is allowed to continue with the heat travelling outwardly from the core area of batch material into the progressively thinning containing wall of the batch, and the heat of the molten glass in the melting tank and the heat in the tank atmosphere simultaneously apply internal and external heat to the floating tube 22 to complete a very rapid and economic melting cycle, as compared with that achieved in a normal glass melting tank operation where the glass forming batch material is fed to the tank in granular form and covers the molten glass like a blanket on the molten glass.

The tubular body of coherent batch 22 may be a unitary body of the desired length or may be made up of a plurality of short lengths in end-to-end abutment.

Instead of preforming a coherent body of glassmaking batch material with a defined core area as hereinbefore described the body shape and core area may be continually produced about a heating source constituted by molten glass at the same time as the heat source, wholly insulated by the batch material, is activated by energized electrodes to utilize the molten glass as an internal conductor of heat at melting temperature to melt the batch material where it embraces the molten glass.

To this end and in accordance with the invention, there is deposited on a base constituted by a thick layer of batch material, a medial bed of molten glass, and the molten glass is covered by another thick layer of batch, the base layer being deformed upwardly from the margins to form a channel sloping from each side towards the middle to locate the heat source constituted by the molten glass, and over the channel electrodes are suspended and precisely lowered in to the covered bed of molten glass and energized to utilize the molten glass as an internal heat source insulated by the batch material.

According to this invention there are two concomitant steps, viz, encapsulating a core of molten glass with a thick layer of heat insulating batch material and energizing the enveloped molten glass through electrodes, whereby the whole volume of molten glass becomes an internal heat source at a temperature for progressively melting the contiguous wrapping of batch material.

In accordance with the present invention apparatus for melting glassmaking batch material comprises a conveyor, a batch hopper above the conveyor and an associated pressure roller mounted above the conveyor to provide a pass to level the batch on the conveyor, a concave roller below the conveyor to shape the conveyor for reception of the batch, a second hopper for pouring molten glass centrally of the batch layer, and a third hopper for the batch to cover the molten glass, perpendicular electrodes located to enter the molten glass through the covering batch, and means for energizing the electrodes and converting the molten glass into a heat source surrounded by the batch material.

Such a method of melting glassmaking batch material will now be described with reference to FIGS. 13 and 14 of the accompanying diagrammatic drawing.

In this arrangement a deformable conveyor 71 formed for example of canvas has its upper run supported by sets of rollers 72 and side rollers 73. The disposition of rollers 72 and 73 causes the conveyor 71 to assume a troughlike form in its upper run.

Each of the rollers 72 is mounted on a shaft 74 supported in bearings 75 carried by the machine frame (not shown) and rollers 73 are mounted on shafts 76 supported by bearing blocks 77, also carried by the machine frame. The conveyor 71 is displaced at uniform speed by motor 78 connected to the shafts 74 of rollers 72.

The upper run of the conveyor 71 passes beneath a first batch feed hopper 79, which continuously discharges batch 22 onto the conveyor 71, which then passes beneath a forming roller 80 which compresses the batch 22 and forms a longitudinal central depression therein. The compressed material then passes beneath a glass dispensing hopper 81 which continuously releases molten glass 21 into the depression in the compressed batch 22 made by roller 80, and then the molten glass passes beneath a second batch dispensing hopper 82 which continuously dispenses batch 22 onto the molten glass 21 to completely cover said glass 21 with a thick batch layer.

Figure 13:
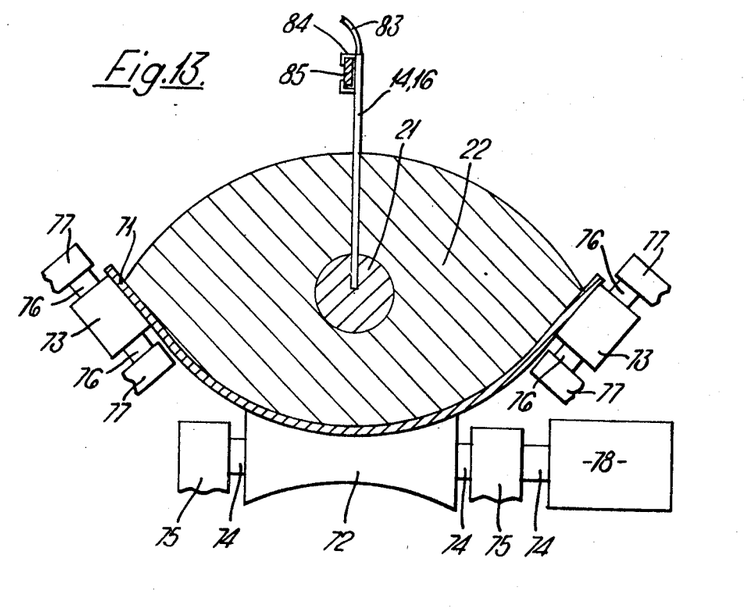
FIGS. 13 and 14 show in sectional elevation and side elevation respectively a method of operation according to the invention wherein the coherent glassmaking batch material is wrapped around a heater to form a core arm occupied by the heater and a confining wall enveloping the heater, as hereinafter more fully described.
Figure 14:
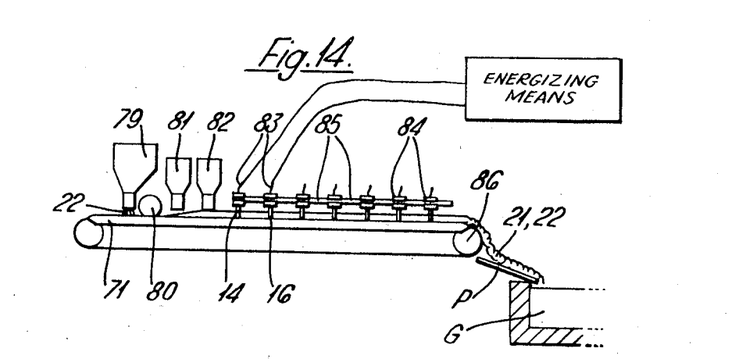

Thus, as will be seen from FIG. 13, the contents of the conveyor 71 after charging, comprise an extended volume of batch 22 lying lengthwise of the conveyor 71 with a molten glass core 21 passing through the center of the cross section of batch 22 and thus, as with the other embodiments hereinbefore described, the batch 22 insulates the molten glass 21, the glass 21 transmitting heat to the batch 22.

As the conveyor 71 passes from beneath hopper 82, electrode pairs 14, 16 having flexible electrical connections 83, are inserted downwardly through the cover of batch material 22 into the molten glass 21. The electrodes 14, 16 are inserted at spaced intervals along the length of the conveyor 71 carrying batch 22 and glass 21 and thus heating current can be passed between selected pairs of electrodes 14, 16 and the molten glass 21 to maintain the molten glass 21 at the desired melting temperature.

The electrodes 14, 16 are attached to carriages 84 which are traversed along a rail 85 so that the electrodes 14, 16 are displaced with the conveyor 71.

The temperature of the molten glass 21 can therefore be maintained at the desired level by suitable regulation of the heating current and, as there is a very high temperature difference between the molten glass 21 and the enveloping batch 22, heat is transmitted to the internal surface of the batch 22 defining a core area and the heat insulating properties of the batch 22 resist the transmission of heat to the external limits of the elongated body of batch 22 lying on the conveyor 71 until the heating operation is well advanced.

At the discharge end of conveyor 71 the electrodes 14, 16 are removed and as the conveyor 71 passes over its end supporting roller 86, the mixed batch 22 and glass 21 is allowed to fall from the conveyor 71 onto an apron P and thus into the glass tank, generally indicated by reference letter G.

By carefully relating the volumes of the batch 22 and molten glass 21 delivered to the conveyor 71 and controlling the heat imparted to the glass 21 by the electric heating current the total amount of heat imparted to the batch 22 leaving the conveyor 71 for delivery to the glass tank G can constitute a very high percentage of the total heat input required to convert the batch 22 to glass. Further, as the batch 22 insulates the conveyor 71 from the heat source, conventional belt materials other than canvas can be used for the construction of the conveyor 71.

I claim:

1. A method of feeding glassmaking batch material to a glass melting tank, comprising the steps of forming a coherent body of the batch material, providing a heat source in a core area of the coherent body, the core area of said body being transformed into molten glass by the heat source and being progressively enlarged as melting takes place, the outer mass of unmolten material acting to converse the heat applied internally thereof, and feeding the preheated and partially molten body of batch material into a glass melting tank.

2. A method according to claim 1, wherein the heat source includes molten glass.

3. A method according to claim 1, wherein the coherent body is encased in a retaining wall to maintain sufficient structural strength in the body when the internal batch surface defining the core area has retreated to the outer regions of the coherent body.

4. A method according to claim 3, wherein the retaining wall is formed by fritting the outer region of the coherent body.

5. A method according to claim 3, wherein the said retaining wall is formed of glass compatible with the molten glass developed from the batch material.

6. A method according to claim 1, wherein the coherent body is in layer form and the layer contiguous to and surrounding the core area comprises one or more of the batch components having the highest melting point, the succeeding surrounding layers comprising components of progressively lower melting points.

7. A method according to claim 2, wherein the core area is charged with compatible cullet which is melted to expedite the provision of a heat source in the form of an electrically conducting body of molten glass in the core area.

8. A method according to claim 2, wherein the core area is provided with a coiled compatible glass with which coiled compatible glass there is operatively associated an electrical conductor through which current is passed to expedite the provision of an electrically conductive heat source of molten glass in the core area of the coherent body of batch material.

9. A method according to claim 1, wherein the coherent body is encased in a retaining wall coaxial with the core area, and a concentric tubular gas vent is constituted above the heat source by a filling of loosely packed batch material extending from within the core area through an opening in the retaining wall.

10. A method according to claim 1, wherein the body of batch material is portable and has a vacant core area constituted by a central socket of small volume as compared with the volume of the coherent body, said socket being effective to receive a heat source for continually transmitting heat to the coherent body.

11. A method according to claim 1 of feeding glassmaking batch material to a glass melting tank having a doghouse, comprising forming the batch material into a tubular body, locating the tubular body in the doghouse of the glass melting tank in coaxial alignment with a set of burners mounted in ports in opposed walls of the doghouse, the burners projecting a flame at batch melting temperature into each end alternately of the tubular body to transform the inner surface of the tubular body into said heat source and the outer surface of the tubular body being simultaneously fritted by the ambient heat in the doghouse, and then rolling the preheated and partially molten body of batch into the glass melting tank.

12. A method according to claim 1, wherein the heat source in the core area of the batch material is formed by spreading a layer of coherent batch material on a deformable support, forming in the layer a channel extending longitudinally of the layer and pouring molten glass into the channel, covering the molten glass with a layer of batch material, projecting aligned electrodes in spaced relation into the molten glass and energizing the electrodes to heat the batch material.

13. A method of feeding glassmaking batch material to a glass melting tank furnace, comprising making a rollable hollow body of the batch, the body having a bore, applying heat to the batch through the bore of the hollow body to progressively melt the material defining the bore, maintaining the internal heat treatment so long as the wall thickness of the body is sufficient to ensure rollability, advancing the internally melted body to the feeding end of the tank and allowing it to dwell in the feeding end thereby subjecting the external surface of the hollow body to the heating effect of the furnace gases, and thereafter rolling the preheated and partially molten body of batch into the glass melting tank.

14. Apparatus for feeding glassmaking batch material to a glass melting tank, comprising means for internally preheating the core area of a coherent body of glassmaking batch material thereby to transform batch material in said core area into molten glass, said preheating means being disposed upstream of the glass melting tank, and means for feeding the preheated and partially molten body of batch material into the glass melting tank.

15. Apparatus according to claim 14, wherein the glass melting tank has a doghouse with ports in opposite sidewalls thereof, the body of batch material is a tubular body, and the preheating means comprise a set of burners mounted in said ports in coaxial alignment with the tubular body of batch material, the burners being arranged to project a flame into each end alternately of the tubular body.

16. Apparatus according to claim 15, wherein the body of batch material is a rollable hollow body, and means are provided for rolling the body through the doghouse into the glass melting tank.

17. Apparatus according to claim 14, wherein said feeding means comprise a pusher.

18. Apparatus according to claim 14, wherein the coherent body of batch material is supported by a confining wall constituted by a fritted outer layer of the body.

19. Apparatus according to claim 14, wherein the coherent body of batch material has a bore and is supported within a container comprising a base, a tubular wall of glass, compatible with the batch material, rested on the base and a lid cooperating with the top of the wall, the lid being apertured coaxially with the tubular wall, a socket of glass compatible with the batch material, and coaxial with the lid aperture, depending into the container at least to the core area of the body and said preheating means being coaxially mounted within said socket and generating in the core area of the body a glass melting temperature.

20. Apparatus according to claim 19, wherein the preheating means include electrode means within the socket which generate heat to melt the glass of the socket and thereby provide an electrically conducting body of molten glass within the core area of the coherent body of batch material.

21. Apparatus according to claim 20, wherein said electrode means comprise an electrode supported by said lid in coaxial relation with the socket and extending into the socket and a matching electrode supported by the base also extending into the socket, the operative ends of the electrodes being axially spaced in the socket, and the base further carrying a connector for connecting the said matching electrode to a mains terminal.

22. Apparatus according to claim 20, wherein said electrode means comprise a pair of parallel electrodes located in the central aperture of the lid and depending into the socket, said electrodes having inwardly turned spaced feet within the socket.

23. Apparatus for feeding glassmaking batch material to a glass melting tank, comprising in combination a conveyor, a batch hopper above the conveyor, and an associated pressure roller mounted above the conveyor to provide a pass to level the batch on the conveyor, a concave roller support below the conveyor to shape the conveyor for reception of the batch, a second hopper for pouring molten glass centrally of the batch layer, and a third hopper for discharging batch material to cover the molten glass, at least one pair of electrodes located to enter the molten glass through the covering batch, and means energizing the electrodes to convert the molten glass into a heat source surrounded by the batch material.

* * * * *